US012611947B2

(12) United States Patent
Barkow et al.

(10) Patent No.: US 12,611,947 B2
(45) Date of Patent: Apr. 28, 2026

(54) SWITCHING ARRANGEMENT FOR A MOTOR VEHICLE AND MOTOR VEHICLE DRIVEN AT LEAST PARTIALLY ELECTRICALLY

(71) Applicant: Dr. Ing. h.c. F. Porsche Aktiengesellschaft, Stuttgart (DE)

(72) Inventors: Maximilian Barkow, Stuttgart (DE); Timijan Velic, Weissach (DE); Jannik Maier, Aichtal (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/067,023

(22) Filed: Dec. 16, 2022

(65) Prior Publication Data

US 2023/0191927 A1    Jun. 22, 2023

(30) Foreign Application Priority Data

Dec. 21, 2021    (DE) ......................... 102021133998.7

(51) Int. Cl.
| | |
|---|---|
| *H01M 10/615* | (2014.01) |
| *B60L 1/02* | (2006.01) |
| *B60L 50/40* | (2019.01) |
| *B60L 50/60* | (2019.01) |
| *B60L 53/20* | (2019.01) |
| *H01M 10/625* | (2014.01) |

(Continued)

(52) U.S. Cl.
CPC ................. B60L 53/20 (2019.02); B60L 1/02 (2013.01); B60L 50/40 (2019.02); B60L 50/60 (2019.02); H02J 7/00304 (2020.01); H02P

27/06 (2013.01); *B60L 2210/40* (2013.01); *B60L 2270/20* (2013.01); *H02J 2207/20* (2020.01); *H02J 2207/50* (2020.01)

(58) Field of Classification Search
CPC .......... B60L 53/20; B60L 50/40; B60L 50/60; H02P 27/06; H02J 7/00304
USPC ........................................... 307/9.1
See application file for complete search history.

(56) References Cited

U.S. PATENT DOCUMENTS

| | | | |
|---|---|---|---|
| 2012/0040224 A1 | 2/2012 | Reischmann et al. | |
| 2013/0188665 A1* | 7/2013 | Namou ................... | B60L 50/40 374/45 |

(Continued)

FOREIGN PATENT DOCUMENTS

| | | | |
|---|---|---|---|
| CN | 105336994 A | * | 2/2016 |
| CN | 205523742 U | | 8/2016 |
| DE | 102011109198 A1 | | 3/2012 |

*Primary Examiner* — Daniel Cavallari
*Assistant Examiner* — Swarna N Chowdhuri
(74) *Attorney, Agent, or Firm* — LEYDIG, VOIT & MAYER, LTD.

(57) ABSTRACT

A switching arrangement for a motor vehicle powered at least partially electrically, including at least one inverter for converting a DC voltage of a high-voltage battery into a multi-phase AC voltage for a travel drive, at least one intermediate circuit capacitor connected to the inverter, and at least one pre-charge resistor, wherein, in a pre-charge mode, the pre-charge resistor serves to prevent current spikes during charging of the at least one intermediate circuit capacitor and, in a heating mode, serves for heating a coolant, wherein electrical current flows through the inverter in both the pre-charge mode as well as in the heating mode.

13 Claims, 3 Drawing Sheets

(51) Int. Cl.
    *H02J 7/00*         (2006.01)
    *H02P 27/06*      (2006.01)

(56)                References Cited

U.S. PATENT DOCUMENTS

| | | | |
|---|---|---|---|
| 2013/0193920 A1* | 8/2013 | Dickerhoof | B60L 53/00 |
| | | | 320/109 |
| 2015/0258901 A1* | 9/2015 | Min | B60L 50/51 |
| | | | 320/137 |
| 2021/0152079 A1* | 5/2021 | Jang | H02H 7/122 |

* cited by examiner

SWITCHING ARRANGEMENT FOR A MOTOR VEHICLE AND MOTOR VEHICLE DRIVEN AT LEAST PARTIALLY ELECTRICALLY

CROSS-REFERENCE TO PRIOR APPLICATION

This application claims benefit to German Patent Application No. DE 10 2021 133 998.7, filed on Dec. 21, 2021, which is hereby incorporated by reference herein.

FIELD

The present invention relates to a switching arrangement for a motor vehicle powered at least partially electrically.

BACKGROUND

The components of the electric powertrain are typically temperature-controlled via a coolant in order to ensure the best possible operating temperatures. In colder operating conditions, and when the travel drive is inactive, and for example before the start of the ride, the coolant is typically heated with an electric heating source. At the start of the travel mode, the active travel drive and the inverter as well as the remaining components of the power electronics then generate sufficient thermal loss in order to heat up the coolant. During the further travel mode, the coolant must typically then be actively cooled in order to remove the thermal loss.

From DE 10 2011 109 198 A1, it is known to use the pre-charge resistor also for heating the coolant and to thereby dispense with the electric heating source. To pre-charge the capacitor, the current from the battery flows via the pre-charge resistor to the capacitor and to the inverter and from there to the battery. In order to be able to heat with the pre-charge resistor, even when the travel drive is inactive, the pre-charge resistor is then connected to the negative terminal of the battery. As a result, in the heating mode, the current flows from the battery to the pre-charge resistor and from there directly back to the battery while bypassing the capacitor and the inverter.

SUMMARY

In an embodiment, the present disclosure provides a switching arrangement for a motor vehicle powered at least partially electrically, comprising at least one inverter for converting a DC voltage of a high-voltage battery into a multi-phase AC voltage for a travel drive, at least one intermediate circuit capacitor connected to the inverter, and at least one pre-charge resistor, wherein, in a pre-charge mode, the pre-charge resistor serves to prevent current spikes during charging of the at least one intermediate circuit capacitor and, in a heating mode, serves for heating a coolant, wherein electrical current flows through the inverter in both the pre-charge mode as well as in the heating mode.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
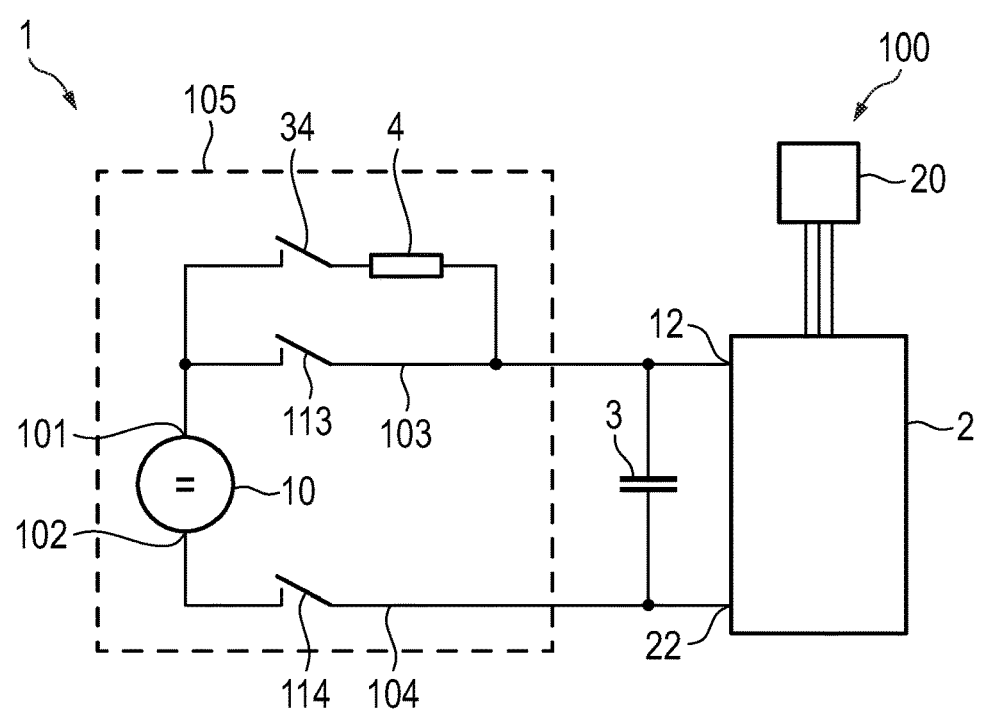
FIG. 1 shows a schematic view of a switching arrangement according to an embodiment of the invention.

In an embodiment, the present invention provides an improved switching arrangement in which the pre-charge resistor can be used for pre-charging the capacitor and can also be used in a heating mode.

In an embodiment, the switching arrangement comprises at least one inverter device for converting a DC voltage of a high-voltage battery into a multi-phase AC voltage for a travel drive and at least one intermediate circuit capacitor and at least one pre-charge resistor. In a pre-charge mode, the pre-charge resistor serves to prevent current spikes during the charging of the intermediate circuit capacitor and, in a heating mode, serves for heating a coolant. Further advantages and features of the present invention arise from the general description and the description of the exemplary embodiment.

The switching arrangement according to an embodiment of the invention is provided for a motor vehicle powered at least partially electrically, and in particular for an electric vehicle and/or hybrid vehicle. The switching arrangement comprises at least one inverter device for converting a DC voltage of a high-voltage battery into a multi-phase AC voltage for a travel drive. The switching arrangement comprises at least one intermediate circuit capacitor connected to the inverter device (in particular in parallel). The switching arrangement comprises at least one pre-charge resistor. The pre-charge resistor can be used in a pre-charge mode, in particular in order to prevent current spikes when charging the intermediate circuit capacitor. The pre-charge resistor can be used in a heating mode for heating a coolant (in particular when the travel drive is inactive or the vehicle is stationary). The electric current (required for charging or heating) flows through the inverter device in both the pre-charging and the heating mode.

The switching arrangement according to an embodiment of the invention offers many advantages. A significant advantage is achieved by the fact that the current flow is conducted not only in the pre-charge mode but also in the heating mode via the inverter device. This eliminates the need for the additional circuit, through which the electrical current is typically conducted in the heating mode. Components, design space, and sources of defects as well as manufacturing and assembly costs can thus be saved. A further advantage is that already existing or developed switching arrangements can be adjusted particularly inexpensively, so that a heating mode is also possible with their pre-charge resistor. This can also save an additional coolant heater in such systems.

It is advantageous that the inverter device provides a high-voltage connection for the flow of power in the heating mode (and preferably only in the heating mode). The high-voltage connection serves in particular for the current flow between the pre-charge resistor and the high-voltage battery. The high-voltage connection is provided in particular within the inverter device, and in particular preferably within a pulse inverter.

The inverter device preferably comprises at least two input contacts. In particular, the inverter device is connected via the input contacts to a respective battery terminal of the high-voltage battery. It is advantageous that the high-voltage connection shorts the input contacts to one another. In particular, the high-voltage connection connects an input contact for the positive terminal to an input contact for the negative terminal. This allows a particularly inexpensive and simultaneously reliable provision of the heating mode.

In an advantageous embodiment, the high-voltage connection is switchable by means of at least one switching unit, in particular the inverter device. In particular, it is conceivable that the switching unit produces the high-voltage connection for the heating mode and breaks the high-voltage connection outside of the heating mode (preferably for the pre-charge mode and/or for the travel mode). For example, the switching unit is integrated into the inverter device. In particular, the switching unit is suitable for and configured so as to short-circuit the input contacts to one another by means of the high-voltage connection.

In an advantageous configuration, it is provided that the switching unit times the high-voltage connection in the heating mode. In particular, a heating power of the pre-charge resistor is thereby selectively controllable and preferably also controllable in the heating mode. In particular, the switching unit is adapted and configured so as to produce the high-voltage connection during the heating mode for a certain time and to break it for a certain time and to continuously repeat the production and disconnection of the high-voltage connection in a defined sequence. In particular, a heating power of the pre-charge resistor in the heating mode is controllable by a targeted change of at least one timing parameter. The timing parameter comprises in particular at least the duration of a high-voltage connection produced and the duration of a broken high-voltage connection. Further suitable timing parameters can also be provided.

In particular, the current flows through a pre-charge circuit in the pre-charge mode. In particular, the power flows through a heating circuit in the heating mode. In particular, the heating circuit differs from the pre-charge circuit only in that the inverter device provides the high-voltage connection. In particular, the pre-charge circuit differs from the heating circuit only in that the high-voltage connection is broken.

In particular, the pre-charge resistor is connected in series between a battery terminal (in particular positive terminal) of the high-voltage battery and the inverter device in the pre-charge mode and also in the heating mode. In particular, the pre-charge resistor is broken from a current flow between the high-voltage battery and the inverter device outside of the pre-charge mode and outside of the heating mode, in particular during the travel mode.

In an advantageous embodiment, it is provided that a switchable pre-charge contactor is arranged between the pre-charge resistor and a battery terminal (in particular positive terminal) of the high-voltage battery and is preferably connected in series. In particular, the pre-charge contactor is closed in the pre-charge mode and also in the heating mode. In particular, the pre-charge contactor is open outside of the pre-charge mode and outside of the heating mode, and particularly during a travel mode. A closed contactor is understood in particular to mean that the contactor releases the current flow. An open contactor is understood in particular to mean that the contactor interrupts the current flow.

Preferably, the pre-charge resistor is connected in parallel to a positive main line. In particular, the positive main connects the inverter device to a battery terminal of the high-voltage battery configured as the positive terminal. In particular, a switchable main contactor for breaking the positive main line is arranged in the positive main line. Preferably, the main contactor is open in the pre-charge mode and also in the heating mode. Preferably, the main contactor is closed during a travel mode. In particular, the positive main line serves to supply power to the inverter device while in the travel mode. In particular, the inverter device is connected to a positive terminal of the high-voltage battery when the main contactor is closed.

The inverter device is connected in particular to a battery terminal of the high-voltage battery configured as a negative terminal via a negative main line. In particular, a further switchable main contactor for breaking the negative main line is arranged in the negative main line. Preferably, the further main contactor is closed in the pre-charge mode and also in the heating mode as well as in a travel mode. Preferably, the further main contactor is opened when the vehicle is turned off (inactive).

In an embodiment, it is preferred that the inverter device does not generate a multi-phase AC voltage for the travel drive in the heating mode. In particular, the inverter device is suitable for and configured so as to permit the provision of the high-voltage connection only in the heating mode and to prevent it in the pre-charge mode as well as in the travel mode.

In an advantageous embodiment, the pre-charge resistor is arranged so as to be directly flowed around by the coolant, at least in sections. In particular, the pre-charge resistor is arranged at least in portions within a coolant channel passing through the coolant. In such a configuration, the coolant is preferably configured dielectrically.

In an embodiment, the pre-charge resistor is thermally connected via a thermally conductive medium to a coolant channel that is perfused by the coolant. The thermal conductive medium can also be referred to as a so-called thermal interface material (TIM). In particular, the thermal conductive medium is arranged between the pre-charge resistor and the coolant channel. In particular, the thermal conductive medium provides a potential separation between the pre-charge resistor and the coolant channel. The pre-charge resistor can also be thermally connected directly to the coolant channel. It is possible that the coolant channel can be provided at least partially by a wall of a battery housing.

The motor vehicle according to an embodiment of the invention comprises at least one switching arrangement. The motor vehicle according to an embodiment of the invention also solves the previously posed tasks particularly advantageously. In particular, the motor vehicle is at least partially electrically powered and preferably configured as an electric vehicle or hybrid vehicle.

The switching arrangement can at least partially comprise the components described in the context of embodiments of the present invention. The switching arrangement can comprise at least one high-voltage battery and/or at least one travel drive. In particular, the travel drive includes at least one electric machine. The switching arrangement can comprise at least one tempering device having at least one cooling channel and a coolant (in particular a liquid). In particular, the switching arrangement is adapted and configured so as to perform the previously described steps for
the heating mode and the pre-charge mode and the travel
mode. In an embodiment, a method of operating the switch-
ing arrangement is also disclosed herein.

In particular, the pre-charge resistor is connected to a
negative terminal of the high-voltage battery in the pre-
charge mode and also in the heating mode only via the
inverter device. In particular, the pre-charge resistor is not
connected in parallel to the inverter device. In particular, the
pre-charge resistor is not switchable in parallel to the
inverter device in the heating mode and in particular also in
the pre-charge mode. In particular, a closed-circuit connec-
tion is not configured between the pre-charge resistor and a
negative terminal of the high-voltage battery in the pre-
charge mode and also in the heating mode.

In particular, the current flows from a positive terminal of
the high-voltage battery in the pre-charge mode and also in
the heating mode, at least for the pre-charge resistor and in
particular at least via the intermediate circuit capacitor
connected in parallel to the inverter device, further to the
inverter device, and (if necessary via at least one further
component) back to a negative terminal of the high-voltage
battery. The intermediate circuit capacitor is in particular
connected in parallel to the inverter device. In particular, the
inverter device comprises at least one pulse inverter or is
configured as such.

In the pre-charge mode, the current flows in particular
through a pre-charge circuit, wherein the pre-charge circuit
comprises at least: the high-voltage battery, the pre-charge
resistor, and the intermediate circuit capacitor. The pre-
charge circuit can comprise the inverter device. In the
heating mode, the current flows in particular through a
heating circuit, wherein the heating circuit comprises at
least: the high-voltage battery, the pre-charge resistor, and
the inverter device with the high-voltage connection. The
heating circuit can comprise the intermediate circuit capaci-
tor. In particular, the inverter device in the heating mode
represents a portion of the heating circuit that is perfused by
current. In travel mode, the current flows in particular
through a travel circuit, wherein the travel circuit comprises
at least: the high-voltage battery, the inverter device, and the
travel drive, in particular with an electric machine. The
travel circuit can comprise the intermediate circuit capacitor.

In particular, the pre-charge resistor is connected down-
stream of a positive terminal of the high-voltage battery. In
particular, the pre-charge resistor is connected upstream of
the intermediate circuit capacitor and the inverter device and
a negative terminal of the high-voltage battery (in particular
in series). In particular, the pre-charge contactor is arranged
between the pre-charge resistor and the positive terminal of
the high-voltage battery. In particular, the pre-charge con-
tactor and the main contactor are arranged in parallel with
one another so that power can flow through the main
contactor in the heating mode and the pre-charge mode and,
outside of the heating mode and the pre-charge mode, via the
main contactor.

In particular, the heating mode and/or the pre-charge
mode is provided and preferably executable only outside of
the travel mode, and more preferably only when the vehicle
is stationary. In all embodiments, it is preferred that the
heating mode is only carried out when the inverter device is
not supplying the travel drive or when the vehicle is sta-
tionary.

In particular, the pre-charge resistor is connected in par-
allel to the positive main line. In particular, the pre-charge
resistor is connected to the positive main line in such a way
that the current can flow via the pre-charge resistor to the intermediate circuit capacitor and/or the inverter device
when the main contactor is open and the pre-charge con-
tactor is closed. In particular, with the main contactor open
and the pre-charge contactor closed, the current can flow via
the pre-charge resistor.

Further advantages and features of embodiments of the
present invention arise from the exemplary embodiments,
which are explained below with reference to the accompa-
nying figures.

FIG. 1 shows a switching arrangement 1 according to an
embodiment of the invention of a motor vehicle 100 con-
figured as an electric vehicle or hybrid vehicle. The switch-
ing arrangement 1 comprises an inverter device 2 for gen-
erating a multi-phase AC voltage for an electric travel drive
20 from a DC voltage of a high-voltage battery 10. The
high-voltage battery 10 houses battery cells, which can be
grouped individually or even into battery modules. In this
case, the inverter device 2 is designed as a pulse inverter, for
example. An intermediate circuit capacitor 3 is connected
upstream of the inverter device in parallel. A pre-charge
resistor 4 is connected upstream of the intermediate circuit
capacitor 3.

The inverter device 2 comprises an input contact 12,
which is connected to a battery terminal 101 of the high-
voltage battery 10 configured as a positive terminal via a
positive main line 103. The inverter device 2 comprises a
further input contact 22, which is connected to a battery
terminal 102 configured as a negative terminal via a negative
main line 104.

A main contactor 113 is arranged in the positive main line
103, and another main contactor 114 is arranged in the
negative main line 104. A pre-charge contactor 34 is
arranged between the pre-charge resistor 4 and the battery
terminal 101 of the high-voltage battery 10. The main
contactors 113, 114 and the pre-charge contactor 34 are
opened here so that no current flows in the switching
arrangement 1. The vehicle 100 is in a resting state and is
parked in, for example, a parking lot.

The dotted frame here indicates the perimeter of a battery
system 105. For example, the components drawn within the
frame are arranged within a common housing of the battery
system 105.

Figure 2:
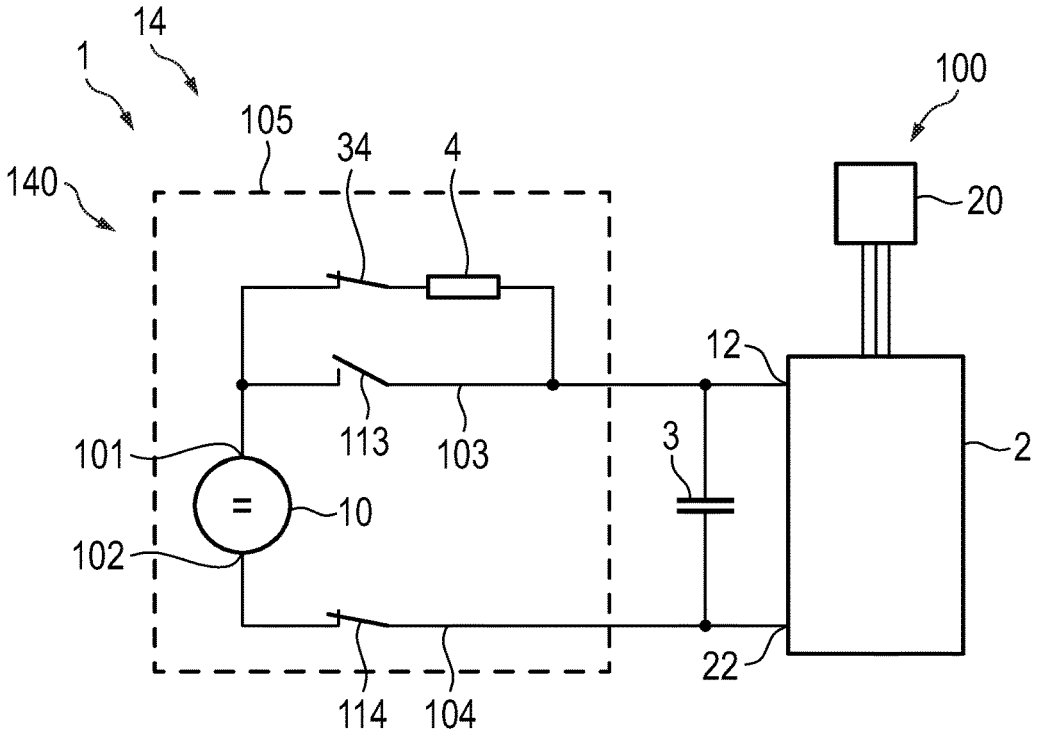
FIG. 2 shows a switching arrangement in a pre-charge mode.

FIG. 2 shows the switching arrangement 1 in a pre-charge
mode 14. For this purpose, the switching arrangement 1 is
switched here so that a pre-charge circuit 140 is available.

After energizing the motor vehicle 100, the intermediate
circuit capacitor 3 is pre-charged in the pre-charge mode 14.
In order to protect the high-voltage battery 10, for example,
the pre-charge resistor 4 is interposed. The pre-charge resis-
tor 4 essentially ensures that the current from the high-
voltage battery 10 does not undesirably increase. The inter-
mediate switching of the pre-charge resistor 4 is taken over
here by the pre-charge contactor 34. The main contactor 113
of the positive main line 103 is opened in the pre-charge
mode 14. The further main contactor 114 of the negative
main line 104 is closed.

After a short time, the intermediate circuit capacitor 3 is
recharged, and the current flow from the high-voltage bat-
tery 10 stops automatically here. Thereafter, the pre-charge
contactor 34 is opened and the main contactor 113 is closed.
Now, the system is operational and the motor vehicle 100
can be driven, for example.

Figure 3:
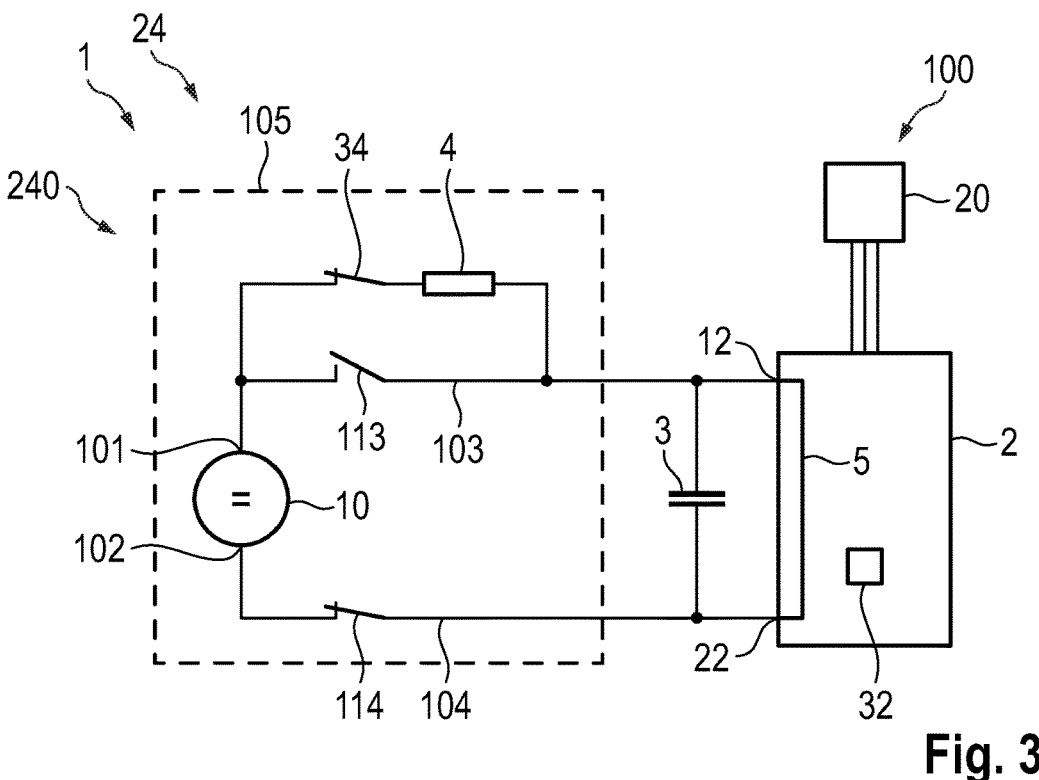
FIG. 3 shows a switching arrangement in a heating mode.

FIG. 3 shows the switching arrangement 1 in a heating
mode 24. For this purpose, the switching arrangement 1 is
switched here so that a heating circuit 240 is available.

In the heating mode 24, the thermal loss of the pre-charge
resistor 4 is used in order to heat up the coolant at low temperatures before the start of the journey. In the heating mode 24, the current flows through the inverter device 2. Because the heating is carried out when the motor vehicle 100 is idling, the inverter device 2 also does not generate a multi-phase AC current for the travel drive 20 during the heating mode 24.

The inverter device 2 provides a high-voltage connection 5 via which the current flow takes place in the heating mode 24. The input contacts 12, 22 are shorted to one another here due to the high-voltage connection 5. In this case, the inverter device 2 is equipped with a switching unit 32, which produces the high-voltage connection 5 in the heating mode and breaks it again in order to end the heating mode 24.

In order to be able to adjust the heating power to the desired heating need, the high-voltage connection 5 can be timed. Timing here means that the short circuit is switched for a certain time and is not switched for a certain time. This process is then repeated continuously in short periods of time. By varying the time periods, an influence can be exerted on the power dissipation of the pre-charge resistor 4 and thus on the heating power. This has the advantage that, if necessary, a correspondingly small pre-charge resistor 4 can be used, which is limited in terms of its maximum heating power.

In the heating mode 24, the pre-charge contactor 34 and the further main contactor 114 are closed. The main contactor 113 is opened. The heating circuit 240 thus differs here only in the additional high-voltage connection 5 from the pre-charge circuit 140 of the pre-charge mode 14.

Figure 4:
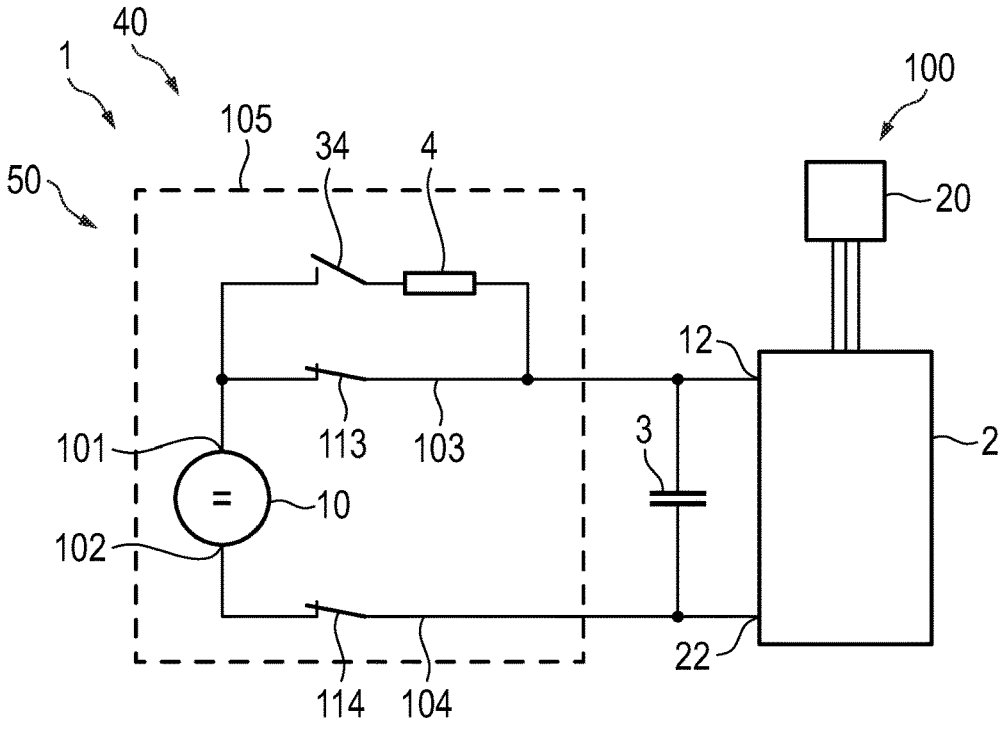
FIG. 4 shows a switching arrangement in a travel mode.

In FIG. 4, the switching arrangement 1 is shown during a travel mode 40. For this purpose, the switching arrangement 1 is connected here in such a way that a travel circuit 50 is available.

In the travel mode 40, the inverter device 2 converts the DC voltage of the high-voltage battery 10 into a multi-phase AC voltage for the power supply of at least one machine of the travel drive 20. The inverter device 2 essentially takes over the control of the electric machine. In travel mode 40, the pre-charge contactor 34 is opened and the two main contactors 113, 114 are closed. If a heating mode 24 has been carried out prior to the start of the journey, the high-voltage connection 5 is now broken or lifted.

Figure 5:
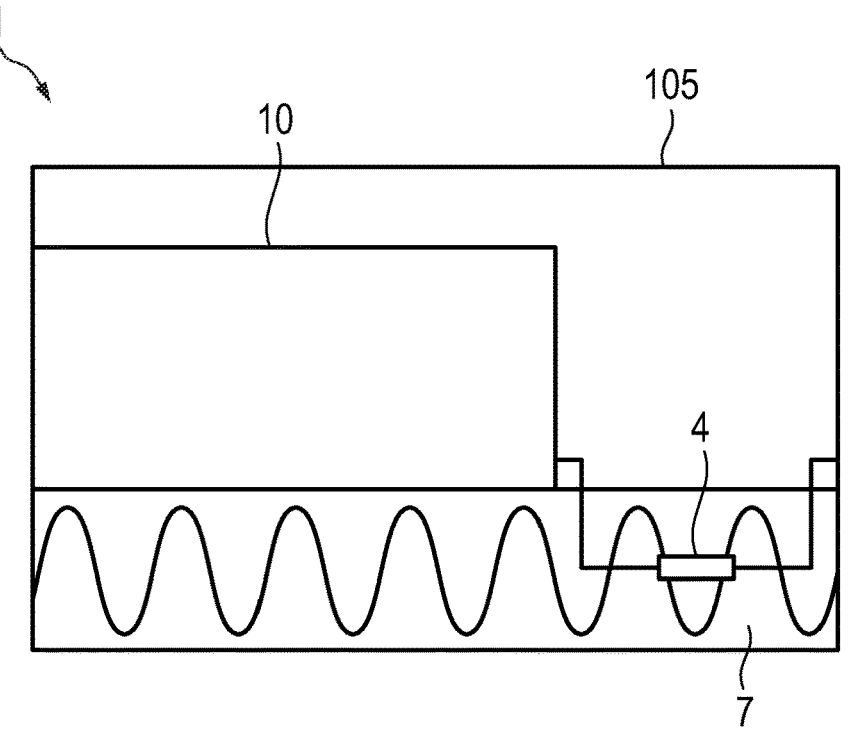
FIG. 5 shows a detailed view of a switching arrangement according to an embodiment of the invention.
Figure 6:
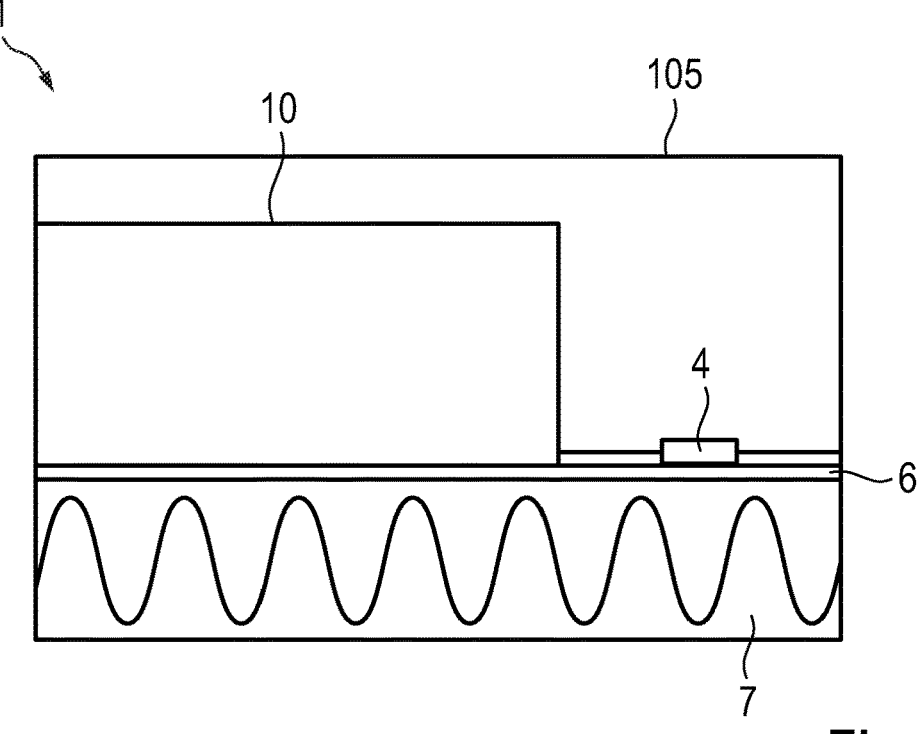
FIG. 6 shows a detailed view of a switching arrangement according to an embodiment of the invention.

In FIGS. 5 and 6, the arrangement of the pre-charge resistor 4 in relation to a tempering device of the motor vehicle 100 is presented. The tempering device can comprise at least one cooling circuit, which serves to remove the heat generated during the operation of the switching arrangement 1. For example, at least the high-voltage battery 10 and the inverter device 2 as well as the electric machine of the travel drive 20 are connected to one or more cooling circuits. As previously described, at low temperatures, the coolant in the cooling circuit can be heated by the pre-charge resistor 4.

In FIG. 5, the pre-charge resistor 4 is arranged in a coolant channel 7 of the tempering device. There, the pre-charge resistor 4 is directly flowed around by the coolant, for example. In the embodiment shown herein purely as an example, the coolant channel 7 runs along the high-voltage battery 10 and battery system 105. In particular, a dielectric coolant is provided here.

FIG. 6 shows an embodiment in which the pre-charge resistor 4 is thermally connected to the coolant channel 7 via a thermal conductive medium 6. The thermal conductive medium 6 can also be referred to herein as TIM (thermal interface material). In the embodiment shown herein as an example, the high-voltage battery 10 or the battery system 105 are also thermally connected to the coolant channel 7 via the thermal conductive medium 6. The pre-charge resistor 4 is also a part of the battery system 105 here and, for example, is arranged in a common housing with the high-voltage battery 10. The coolant channel 7 can also be part of such a housing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Switching arrangement
2 Inverter device
3 Intermediate circuit capacitor
4 Pre-charge resistor
5 High-voltage connection
6 Thermal conductive medium
7 Coolant channel
10 High-voltage battery
12 Input contact
14 Pre-charge operation
20 Traction drive
22 Input contact
24 Heating operation
32 Switching unit
34 Pre-charge contactor
40 Travel mode
50 Driving circuit
100 Motor vehicle
101 Battery terminal
102 Battery terminal
103 Positive main line
104 Negative main line
105 Battery system
113 Main contactor
114 Main contactor
140 Pre-charge circuit
240 Heating circuit

The invention claimed is:

1. A switching arrangement for a motor vehicle powered at least partially electrically, comprising:

at least one inverter for converting a DC voltage of a high-voltage battery into a multi-phase AC voltage for a travel drive;

at least one intermediate circuit capacitor connected to the inverter; and at least one pre-charge resistor, wherein, in a pre-charge mode, the pre-charge resistor serves to prevent current spikes during charging of the at least one intermediate circuit capacitor and, in a heating mode, serves for heating a coolant, wherein electrical current flows through the inverter in both the pre-charge mode as well as in the heating mode, wherein the inverter provides a high-voltage short circuit for the electrical current flow in the heating mode so as to heat the coolant, wherein the inverter electrically separates the high-voltage short circuit for the electrical current flow in the pre-charge mode; and wherein the high-voltage short circuit is provided by a switch for controlled periods of time such that the high-voltage short circuit is repeatedly provided according to a timing parameter and then broken according to the timing parameter.

2. The switching arrangement according to claim 1, wherein the inverter comprises two input contacts and is connected via the input contacts to respective battery terminals of the high-voltage battery, and wherein the high-voltage short circuit shorts the input contacts to one another.

3. The switching arrangement according to claim 1, wherein the high-voltage short circuit is switchable by the switch of the inverter and wherein the switch produces the high-voltage short circuit for the heating mode and electrically separates the high-voltage short circuit in the pre-charge mode.

4. The switching arrangement according to claim 3, wherein the switch times the high-voltage short circuit in the heating mode so that a heating power of the pre-charge resistor is selectively controllable in the heating mode.

5. The switching arrangement according to claim 1, wherein the electrical current in the pre-charge mode flows through a pre-charge circuit and in the heating mode flows through a heating circuit, and wherein the heating circuit differs from the pre-charge circuit in that the inverter provides the high-voltage short circuit.

6. The switching arrangement according to claim 1, wherein the pre-charge resistor is connected in series between a battery terminal of the high-voltage battery and the inverter in the pre-charge mode and also in the heating mode.

7. The switching arrangement according to claim 1, wherein a switchable pre-charge contactor is arranged between the pre-charge resistor and a battery terminal of the high-voltage battery, and wherein the pre-charge contactor is closed in the pre-charge mode and also in the heating mode.

8. The switching arrangement according to claim 1, wherein the pre-charge resistor is connected in parallel to a positive main line, which connects the inverter to a battery terminal of the high-voltage battery configured as a positive terminal, and wherein a switchable main contactor is arranged in the positive main line for electrically separating the positive main line and wherein the main contactor is opened in the pre-charge mode and also in the heating mode.

9. The switching arrangement according to claim 1, wherein the inverter is connected via a negative main line to a battery terminal of the high-voltage battery configured as a negative terminal, and wherein a further switchable main contactor is arranged in the negative main line for electrically separating the negative main line and wherein the further main contactor is closed in the pre-charge mode and also in the heating mode as well as in a travel mode.

10. The switching arrangement according to claim 1, wherein the inverter does not generate a multi-phase AC voltage for the travel drive in the heating mode.

11. The switching arrangement according to claim 1, wherein the pre-charge resistor is arranged so as to be directly flowed around by the coolant, at least in sections.

12. The switching arrangement according to claim 1, wherein the pre-charge resistor is thermally connected via a thermal conductive medium to a coolant channel perfused by the coolant.

13. A motor vehicle having a switching arrangement according to claim 1.

* * * * *